United States Patent

[11] 3,554,440

| [72] | Inventors | Irving G. Austin<br>Inglewood;<br>Max V. Greeven, Palos Verdes Estates;<br>Steven A. Shaw, Manhattan Beach, Calif. |
|---|---|---|
| [21] | Appl. No. | 819,583 |
| [22] | Filed | Apr. 28, 1969 |
| [45] | Patented | Jan. 12, 1971 |
| [73] | Assignee | The Garrett Corporation<br>Los Angeles, Calif.,<br>a corporation of California |

[54] THERMOSTATIC VALVE
14 Claims, 1 Drawing Fig.

[52] U.S. Cl. .................................................... 236/34.5, 236/92
[51] Int. Cl. ..................................................... F01p 7/16
[50] Field of Search ........................................... 236/34.5, 93, 93A

[56] References Cited
UNITED STATES PATENTS

| 2,212,285 | 8/1940 | Ayres | 236/92A |
| 2,756,936 | 7/1956 | Mueller | 236/92C |
| 3,190,555 | 6/1965 | Wilson | 236/92X |
| 3,300,135 | 1/1967 | Slater | 236/92 |
| 3,404,837 | 10/1968 | James | 236/34.5 |

Primary Examiner—Edward J. Michael
Attorneys—Albert J. Miller and John N. Hazelwood ABSTRACT: A thermostatic valve having a bimetallic member controlling the flow of fluid between two chambers of the valve. When the flow of fluid is prevented between the valve chambers, it is passed through a heat dissipating means.

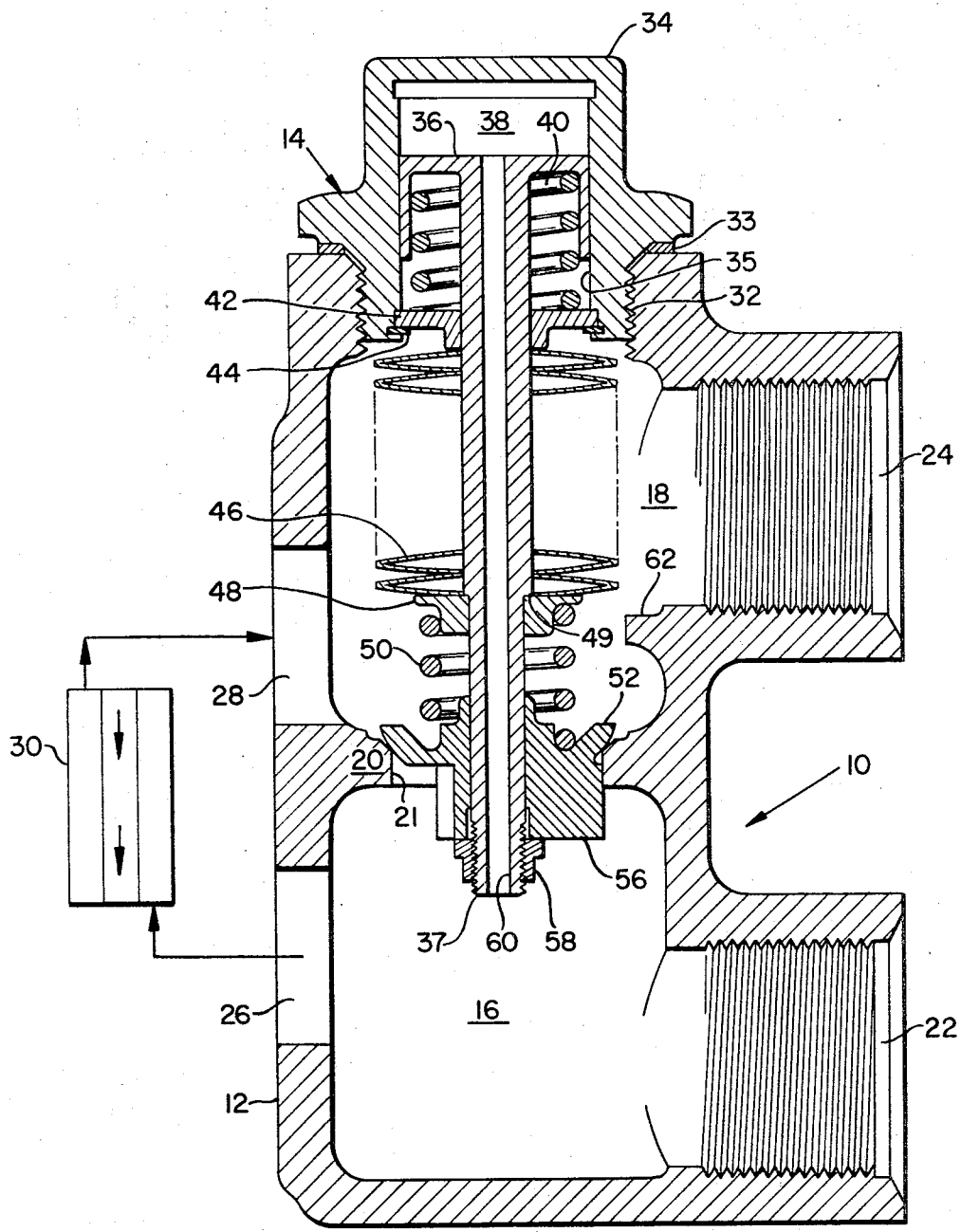

I 3,554,440

THERMOSTATIC VALVE

BACKGROUND OF THE INVENTION

In fluid circuits, such as lubricating systems for high-speed transmissions, a lubricant cooler (heat exchanger) is often incorporated to prevent overheating of the lubricant. Since it is not desirable to pass the lubricant through the cooler until it has reached a certain minimum temperature, a heat responsive or thermostatic valve is normally included with the fluid circuit. In this manner, the lubricant is bypassed around the cooler until it reaches a minimum level at which point the valve is closed, for example by the expansion of bimetallic elements, thereby directing the lubricant through the cooler. A thermal bypass valve with bimetallic control is disclosed in U.S. Pat. No. 3,404,837 issued Oct. 8, 1968 to D. W. James. This valve, however, is inherently limited in several significant respects. Its utilization is limited to environments where only minimal acceleration forces are encountered due to the manner in which the valve subassembly is supported. Also, while the valve does include a pressure relief feature, the pressure relief is directly dependent upon the fluid temperature and must collapse the bimetallic elements to be effective.

SUMMARY OF THE INVENTION

The present invention provides an improved thermostatic valve which includes adjustable, and essentially temperature independent, pressure relief. The valve, positioned in a fluid path, directs the flow of fluid through either of two paths, one of which includes a cooler. The valve, normally biased in the open position is closed by pressure balanced thermal responsive means. Pressure relief is provided by resilient means positioned adjacent the thermal responsive means. Support for the valve is provided at both ends thereof.

In this manner, the valve can be adjusted to provide pressure relief at any preselected value and changes in fluid temperature will not affect this setting. Likewise the valve can be utilized in environments which experience severe acceleration forces since it is supported at both ends.

BRIEF DESCRIPTION OF DRAWING

The single FIG. is a section view of the thermostatic valve of the present invention.

DESCRIPTION OF THE PREFERRED EMBODIMENTS

As illustrated in the single FIG., the valve 10 comprises a valve housing 12 and thermostat 14. The valve housing 12 includes an inlet chamber 16 and outlet chamber 18 separated by an annular flange which serves as a valve seat 20. A valve inlet 22 communicates with the valve inlet chamber 16 while an outlet 24 communicates with the outlet chamber 18. Openings 26 and 28 are also provided in the inlet and outlet chambers 16 and 18 respectively to provide communication with a heat dissipating element 30 such as a heat exchanger.

The oil outlet chamber 18 is also provided with an opening 32, shown as threaded, to receive the thermostat 14. The thermostat 14 includes a support member such as an end cap 34 which is threaded into the opening 32 in the chamber 18. A gasket or seal 33 can be provided to prevent leakage between the thermostat 14 and housing 12. The interior of the end cap 34 is recessed to form a piston cylinder 35. A balancing piston 36, slidable within the piston cylinder 35 constitutes one end of a valve stem 37 which extends from the end cap 34 through the outlet chamber 18 and valve seat 20. A balancing chamber 38 is formed between the piston 36 and the bottom of the cylinder 35 and communicates with the inlet chamber 16 through a central bore 60 in the valve stem 37. Mounted around the valve stem 37, proceeding from the piston end, are a return spring 40, return spring retainer 42, bimetallic elements 46, pressure relief spring retainer 48, pressure relief spring 50, valve poppet 52, and locknut 58. The valve stem 37 is slidable within each of these elements except the locknut 58. A shoulder 49 is provided on the valve stem 37 to limit the movement of the pressure relief spring retainer 48 towards the bimetallic elements 46. A flow diverter 62 may be provided in the interior of the outlet chamber 18 to direct the fluid passing through the valve seat 20 over the bimetallic elements 46 and thereby improve mixing in the chamber 18 with the fluid from the heat exchanger.

The return spring retainer 42 is held at the open end of the piston cylinder 35 by a lockring 44. This retainer 42 also serves as a bearing for the piston end of the valve stem 37. The return spring 40, held by the return spring retainer 42 normally biases the piston 36 toward the bottom of the piston cylinder 35. The bimetallic elements 46, such as a plurality of bimetallic discs formed as a Belleville washer-type spring, are slidably positioned on the valve stem 37. The pressure relief spring 50 is positioned between pressure relief spring retainer 42 and the poppet 52 which is held on the valve stem 37 by the locknut 58. The poppet 52 as illustrated includes webs 56 which are slidable within the flat support position 21 of the valve seat 20. Alternately, the valve stem 37 can be extended beyond the valve seat 20 and receive support from a separate bearing, or support area (not shown) in the inlet chamber 16 of the valve housing 12.

When not in operation, the valve thermostat is in the bypass open position, that is the valve poppet is positioned at some distance from the valve seat and fluid can flow from the inlet chamber to the outlet chamber through the valve seat or bypass. With the valve open, fluid will principally flow through the bypass. The thermostat is maintained in the bypass open position by the positive action of the return spring acting against the piston.

As the operation of the system is initiated, heat is generated within the system and the temperature of the fluid increases. This temperature increase will change the radius of curvature of the bimetallic elements and result in an increase in stack length. The opposed curvature bimetallic elements function essentially as a temperature-sensitive Belleville spring. This change in length provides the motive force to more the poppet towards the valve seat as one end of the bimetal stack forces against the relief spring retainer while the other end is positioned against the fixed return spring retainer. This results in the compression of the return spring as the poppet is moved towards the valve seat.

The bimetallic elements are pressure balanced by porting the pressure found in the inlet chamber to the balancing chamber through the hole in the valve stem. This balancing reduces the pressure differential induced force acting upon the valve poppet from loading the bimetals. The effective area of the face of the balancing piston is slightly smaller than the effective area of the poppet face to insure positive pressure loading of the bimetallic elements by the return spring.

When the temperature of the fluid has reached a preselected minimum value, expansion of the bimetallic elements will force the poppet into engagement with the valve seat and thereby stop the flow of fluid through this bypass. The fluid is thus forced to flow through the heat exchanger where it is cooled. The valve poppet is shown with a spherical surface which contacts the corner of the valve seat 20 to establish a circular line contact therebetween. This assists the alignment and seating of the poppet.

After the poppet makes contact with the valve seat, further movement of the poppet in that direction is no longer possible. A further increase in temperature will increase the load against the poppet from the restrained bimetallic elements. The increase in loading will be a function of the spring constant for the bimetal stack and relief spring. This load is symmetrically distributed on the poppet by the pressure relief spring which is of sufficient stiffness so as to essentially withstand any further compression by this increased load from the bimetallic elements. The spring will thus act as a rigid member allowing direct transmission of changes of bimetallic element length to poppet position. In the event of extreme temperatures however, the pressure relief spring will permit the relief of potentially excessive stress in the restrained bimetallic elements and thereby prevent damage thereto.

The pressure relief spring is initially compressed to a preselected compressed length between the poppet and pressure relief spring retainer. This compressed length can be adjusted by means of the locknut on the valve stem. The spring stiffness and compressed length are selected such that further compression of the spring will take place at a given fluid pressure differential acting upon the exposed area of the poppet. This pressure force is above the force developed by the expanded bimetallic elements. In this manner, the poppet will be forced away from the seat sliding over the essentially stationary valve stem when a preselected fluid pressure is exceeded in the inlet chamber. Thus the bypass of fluid around the heat exchanger is permitted even though the fluid is at a temperature above which the fluid would normally be diverted through the heat exchanger. The pressure relief valve is therefore essentially independent of the temperature of the fluid.

When the temperature of the fluid decreases, the bimetallic elements contract and decrease in length thereby permitting the force exerted by the return spring to unseat the poppet from the valve land permit the flow of fluid directly from the inlet chamber to the outlet chamber. In either the fluid flow path from the inlet chamber through the heat exchanger and out through the outlet chamber or the fluid flow path from the inlet chamber to the outlet chamber through the valve seat. The bimetallic elements are always exposed to the fluid flow and the bimetallic elements will change their length in response to the temperature of this fluid.

While the thermostat 14 is shown in a valve housing 12, the thermostat may be positioned anywhere in a fluid circuit where a bypass is provided between two fluid chambers. For example, the housing structure may be made integral with a lubricant manifold structure. Likewise a single valve can be utilized or a series of axially stacked valves can be positioned to provide control at varying temperatures.

In this manner, a thermostatic valve is provided that is reactive to both the absolute temperature of a fluid and to pressure differentials which result from the fluid flow. The valve includes pressure relief for the valve poppet which is basically independent of the thermostatic function following closure of the valve poppet against the valve seat. The valve is essentially insensitive to indirect factors which such as extremes of fluid temperature, age, and deteriorating effects of the fluid. Since the valve stem is supported at both ends, the valve is relatively unaffected by acceleration forces which might otherwise increase wear and decrease component life.

While specific embodiments of the invention have been illustrated and described, it is to be understood that these embodiments are provided by way of example only and that the invention is not to be construed as being limited thereto, but only by the proper scope of the following claims.

We claim:

1. A thermostat for use in a valve having fluid guide structure defining a pair of distinct fluid paths and a bypass passage interconnecting said paths including a valve seat therein, comprising:
   a valve member;
   means mounting said valve member in one of said fluid paths for movement toward and from seating engagement with said valve seat;
   means resiliently biasing said valve member away from said valve seat;
   thermally responsive means disposed in said one fluid path and operably connected to said valve member to engage said valve seat when the fluid temperature in said one path exceeds a preselected magnitude; and
   means to substantially pressure balance said thermally responsive means, said pressure balancing means having an effective pressure responsive area less than the area of said valve member exposed to the fluid pressure in said other fluid path when said valve member is engaged with said valve seat and including partially compressed resilient means, whereby, when the fluid pressure in said other path exceeds a preselected magnitude substantially independent of fluid temperature, said valve member is unseated to relieve the pressure in said other path.

2. The combination defined in claim 1 wherein said fluid guide structure is formed with a through opening in the wall of said one path opposite to and in alignment with said valve seat and wherein said thermostat further comprises a support member extending through and fixed in fluidtight relation within said through opening, each of the other thermostat components being mounted on and supported by said support member.

3. The combination defined in claim 2 wherein said support member comprises a bearing mounted on said support member at the side of said one path opposite said valve seat and a valve stem axially reciprocably mounted in said bearing, extending transversely of said one path and supporting said valve member at the side of said one path opposite said valve seat.

4. The combination defined in claim 3 wherein said fluid guide structure includes bearing means to support the thermostat adjacent said valve member.

5. The combination defined in claim 4 wherein said valve member includes a plurality of spaced support webs slidable within said guide structure bearing means.

6. The combination defined in claim 3 wherein said pressure balancing means comprises a fluid chamber in said support member enveloping the end of said valve stem remote from said valve member, a piston slidable within said chamber affixed to said valve stem, a fluid passage extending through said valve stem from said chamber at the side of said piston remote from said valve member to the side of said valve member remote from said piston, and a partially compressed resilient member interposed between said valve member and said thermally responsive means.

7. The combination defined in claim 6 wherein said thermally responsive means comprises a plurality of annular bimetallic members arranged in a Belleville-type stack and interposed in surrounding relation to said valve stem between said bearing and said partially compressed resilient member.

8. The combination defined in claim 2 wherein said support member is threadedly engaged with said through opening and has an enlarged head of noncircular cross section.

9. The combination defined in claim 8 wherein a gasket is interposed between said support member head and said fluid guide structure.

10. A thermostatic valve for a fluid system for having a primary and a secondary fluid circuit comprising:
   a valve housing open at one end and divided by an inwardly extending annular flange into inlet and outlet chamber portions, said inlet and outlet chamber portions being in open communication with said primary and secondary circuits, said outlet chamber portion containing the open end of said valve housing;
   an end cap adapted to close said open end of said valve housing and having an inwardly facing recess;
   a piston slidably mounted in said recess and having a hollow piston rod extending into said inlet chamber, said hollow piston rod providing fluid communication between said inlet chamber and said end cap recess;
   a piston rod support fixedly mounted at the open end of said inwardly facing recess, said piston rod slidably through said support;
   a valve poppet mounted on said piston rod and adapted to sealingly engage said inwardly extending annular flange thereby interrupting fluid communication between said inlet and outlet chamber portions;
   temperature responsive means mounted around said piston rod adjacent sd piston rod support;
   first resilient means interposed between said piston rod support and said piston to bias said valve poppet away from said inwardly extending annular flange, whereby in response to the fluid temperature reaching a preselected value, said temperature responsive means overcomes the biasing force of said first resilient means and moves said valve poppet into sealing engagement with said inwardly extending annular flange and in response to a reduction of fluid temperature below the preselected value, said first resilient means urges said piston away from said support thereby releasing said valve poppet from sealing engagement with said inwardly extending annular flange; and a second resilient means compressed between said temperature responsive means and said valve poppet whereby in response to the fluid pressure in said inlet chamber reaching a preselected value substantially independent of fluid temperature, and said second resilient means is further compressed by said pressure to permit said valve poppet to be released from sealing engagement with said inwardly extending annular flange, said second resilient means having a stiffness greater than the stiffness of said first resilient means.

11. The thermostatic valve of claim 10 wherein said valve housing includes support means for the valve poppet end of said hollow piston rod.

12. The thermostatic valve of claim 11 wherein said valve poppet includes a plurality of spaced support webs slidable within said support means.

13. The thermostatic valve of claim 10 wherein said first and second resilient means are coil springs.

14. The thermostatic valve of claim 10 wherein said temperature responsive means are a plurality of annular bimetallic discs.

UNITED STATES PATENT OFFICE
CERTIFICATE OF CORRECTION

Patent No. 3,554,440                    Dated January 12, 1971

Inventor(s) Irving G. Austin, Max V. Greeven and Steven A. Shaw

It is certified that error appears in the above-identified patent and that said Letters Patent are hereby corrected as shown below:

Claim 10, line 1, delete "for" (second occurrence)

Claim 10, line 23, delete "sd" substitute --said--

Signed and sealed this 28th day of March 1972.

(SEAL)
Attest:

EDWARD M. FLETCHER, JR.              ROBERT GOTTSCHALK
Attesting Officer                    Commissioner of Patents